(12) United States Patent
Han et al.

(10) Patent No.: US 11,735,727 B2
(45) Date of Patent: *Aug. 22, 2023

(54) LITHIUM SECONDARY BATTERY

(71) Applicant: SK ON CO., LTD., Seoul (KR)

(72) Inventors: Kook Hyun Han, Daejeon (KR); Kyung Bin Yoo, Daejeon (KR); Duck Chul Hwang, Daejeon (KR)

(73) Assignee: SK ON CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/591,123

(22) Filed: Feb. 2, 2022

(65) Prior Publication Data

US 2022/0158182 A1    May 19, 2022

Related U.S. Application Data

(63) Continuation of application No. 15/371,936, filed on Dec. 7, 2016, now Pat. No. 11,251,425.

(30) Foreign Application Priority Data

Dec. 9, 2015 (KR) ........................ 10-2015-0175166

(51) Int. Cl.
*H01M 4/505* (2010.01)
*H01M 4/131* (2010.01)
(Continued)

(52) U.S. Cl.
CPC ............ *H01M 4/505* (2013.01); *C01G 53/50* (2013.01); *H01M 4/131* (2013.01); *H01M 4/525* (2013.01);
(Continued)

(58) Field of Classification Search
CPC .. C01G 53/50; C01P 2006/40; H01M 10/052; H01M 10/0525; H01M 4/131; H01M 4/505; H01M 4/525; H01M 4/625
See application file for complete search history.

(56) References Cited

U.S. PATENT DOCUMENTS 11,251,425 B2 *  2/2022  Han ..................... H01M 4/131
2014/0332731 A1 * 11/2014  Ma ........................... C09D 7/70
                                                      252/506

FOREIGN PATENT DOCUMENTS

KR   10-2012-0079802 A      7/2012
KR   10-2013-0108816 A     10/2013
WO   WO 2014180719    * 11/2014

OTHER PUBLICATIONS

Office Action for the Korean Patent Application No. 10-2015-0175166 issued by the Korean Intellectual Property Office dated Sep. 7, 2022.

* cited by examiner

*Primary Examiner* — Sarah A. Slifka
*Assistant Examiner* — Rachel L Zhang
(74) *Attorney, Agent, or Firm* — IP & T Group LLP

(57) ABSTRACT

Provided is a lithium secondary battery including a cathode containing a cathode active material in which a central part has a different concentration from a surface part, and a conductive material having a specific composition ratio, and specifically, a lithium secondary battery including a cathode containing a cathode active material in which a central part of one or more kinds of metals configuring the cathode active material has a different concentration from a surface part thereof, and two or more kinds of conductive materials mixed at a specific ratio, thereby having excellent stability and high low-temperature characteristic and high output characteristic as compared to a conventional lithium secondary battery.

8 Claims, 3 Drawing Sheets

(51) Int. Cl.
  *H01M 4/62* (2006.01)
  *H01M 4/525* (2010.01)
  *C01G 53/00* (2006.01)
  *H01M 10/0525* (2010.01)
  *H01M 10/052* (2010.01)
(52) U.S. Cl.
  CPC ......... *H01M 4/625* (2013.01); *C01P 2006/40* (2013.01); *H01M 10/052* (2013.01); *H01M 10/0525* (2013.01)

LITHIUM SECONDARY BATTERY

CROSS-REFERENCE TO RELATED APPLICATIONS

This application is a continuation of U.S. patent application Ser. No. 15/371,936 filed on Dec. 7, 2016, which claims priority under 35 U.S.C. § 119 to Korean Patent Application No. 10-2015-0175166, filed on Dec. 9, 2015, in the Korean Intellectual Property Office, the disclosure of which is incorporated herein by reference in its entirety.

TECHNICAL FIELD

The following disclosure relates to a lithium secondary battery, and more specifically, to a lithium secondary battery wherein a cathode includes a cathode active material in which a central part of one or more kinds of metals configuring the cathode active material has a different concentration from a surface part thereof, and two or more conductive materials mixed at a specific ratio, thereby having excellent stability and high low-temperature characteristic and high output characteristic.

BACKGROUND

In accordance with technology development and an increase in demand for mobile devices, the demand for secondary batteries as energy sources has been rapidly increasing. Among these secondary batteries, a lithium secondary battery having high energy density and voltage has been commercialized and widely used.

In order to use the lithium secondary battery as a power source for an electric vehicle, a hybrid electric vehicle, etc., the lithium secondary battery is required to have performance in which it is capable of operating under harsher conditions in a mobile phone, a notebook, a personal digital assistant (PDA), etc. Since vehicles need to operate at a low temperature, for example, during the winter, a representative example of such a requirement is excellent output characteristic at a low temperature.

Meanwhile, a cathode active material among components of the lithium secondary battery plays an important role in determining performances such as battery capacity, an output characteristic, etc., in the battery.

Lithium cobalt oxide ($LiCoO_2$), which has relatively excellent general physical properties such as excellent cycle characteristic, etc., is mainly used as a cathode active material. However, cobalt used in $LiCoO_2$, which is a rare metal, has a small amount of reserves and production are unevenly distributed, and thus, supply is unstable. In addition, $LiCoO_2$ has a problem of high cost due to instability of cobalt supply and an increase in demand of the lithium secondary battery.

Accordingly, a study on the cathode active material capable of replacing $LiCoO_2$ has been conducted steadily, and in particular, a technique of replacing cobalt with manganese, nickel, etc., has been considered, but it is difficult to apply this replacing technique to actual mass production or the cycle characteristic is reduced.

In order to overcome these disadvantages, a method of using a lithium composite transition metal oxide or a lithium transition metal phosphate containing two or more kinds of transition metals as the cathode active material has been studied. However, there are still problems such as reduction in capacity, reduction in high-rate characteristic, etc., due to instability of the transition metal. In particular, a composite transition metal oxide containing iron has higher electrical resistance in the same state with the same open circuit voltage (OCV), and thus, the composite transition metal cathode active material still has a problem of insufficient output characteristic despite advantages of low cost and high safety. Further, a problem of reduction in capacity and output of the battery due to a decrease in electrochemical reaction rate at a low temperature is serious.

Therefore, there is a high need for a lithium secondary battery technology having a high capacity under low-temperature condition and excellent output characteristic.

RELATED ART DOCUMENT (Patent Document 1) Korean Patent Laid-Open Publication No. 10-2012-0130715 (Dec. 3, 2012)

SUMMARY

An embodiment of the present disclosure is directed to providing a lithium secondary battery including a cathode containing a cathode active material in which a central part of one or more kinds of metals configuring the cathode active material has a different concentration from a surface part thereof, and two or more kinds of conductive materials mixed at a specific ratio, thereby having excellent stability and high low-temperature characteristic and high output characteristic.

The present disclosure relates to a lithium secondary battery.

In one general aspect, a lithium secondary battery includes a cathode, an anode, an electrolyte, and a separator, wherein the cathode includes a cathode active material in which a transition metal concentration of a central part is different from that of a surface part, and a conductive material in which a carbon large surface area structure and a carbon small surface area structure are mixed at a weight ratio of 10:90 to 70:30.

DETAILED DESCRIPTION OF EMBODIMENTS

Hereinafter, a lithium secondary battery according to the present disclosure is described in more detail with reference to specific exemplary embodiments of the present disclosure. Meanwhile, specific exemplary embodiments and Examples are provided as a reference for explaining the present disclosure in detail, and therefore, the present disclosure is not limited thereto, but may be implemented in various ways.

Unless defined otherwise, all technical and scientific terms used herein have the same meanings generally understood by those skilled in the art to which the present disclosure pertains. Terms used in the specification of the present disclosure are merely provided to effectively describe specific exemplary embodiments, but are not intended to limit the present disclosure.

The present inventors continuously studied to overcome disadvantages of a conventional lithium secondary battery, i.e., a low discharge output and a reduction in discharge capacity at a low temperature, and found that when a cathode active material in which a concentration of a central part is different from that of a surface part was used, and simultaneously, a composition ratio of two or more conductive materials included in a cathode was controlled, it was able to improve a discharge output, and to suppress a reduction in discharge capacity at a low temperature, and as a result, completed the present disclosure.

A lithium secondary battery according to the present disclosure includes a cathode active material in which a central part of one or more metals has a different concentration from a surface part thereof and a conductive material having a specific composition, such that a discharge output is 3,000 W/kg, and more preferably 3,300 W/kg or more, and a discharge capacity at −20° C. as compared to room temperature (25° C.) is 75% or more, and more preferably, 80% or more.

The lithium secondary battery according to the present disclosure may include a cathode, an anode, an electrolyte, and a separator, wherein the cathode may include a cathode active material in which a central part of one or more metals has a different concentration from a surface part thereof; and a conductive material in which a carbon large surface area structure and a carbon small surface area structure are mixed at a weight ratio of 10:90 to 70:30.

Figure 1:
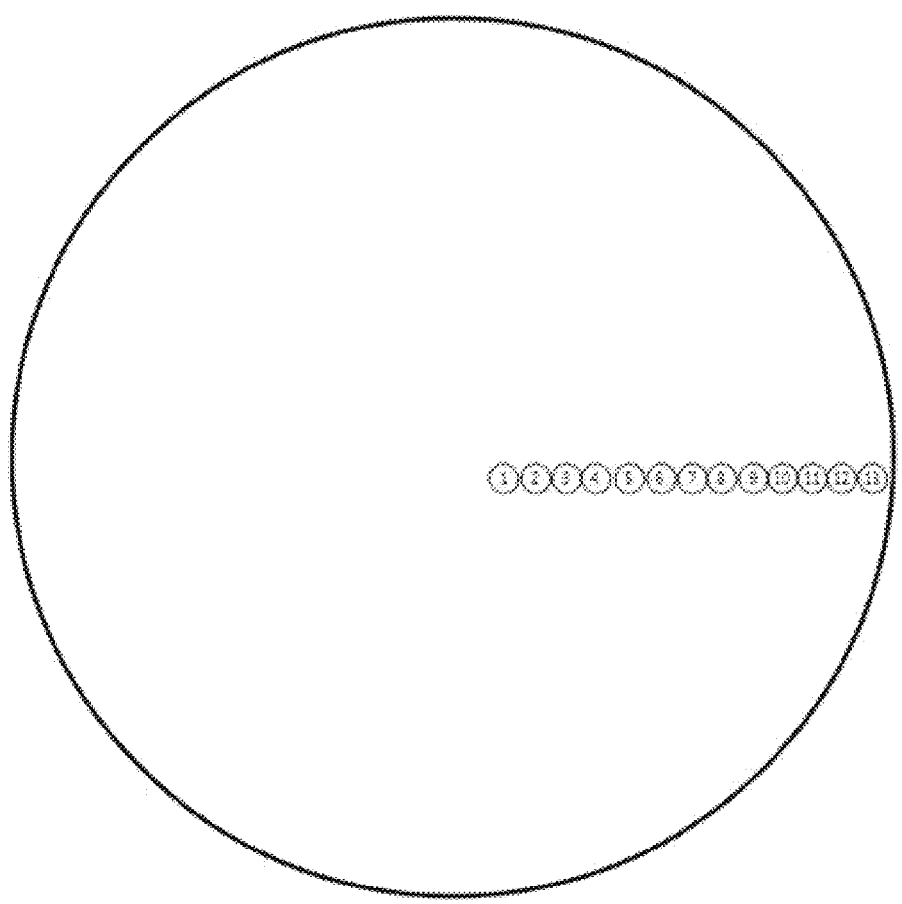
FIG. 1 shows a cross section of a cathode active material according to an exemplary embodiment of the present disclosure.
Figure 2:
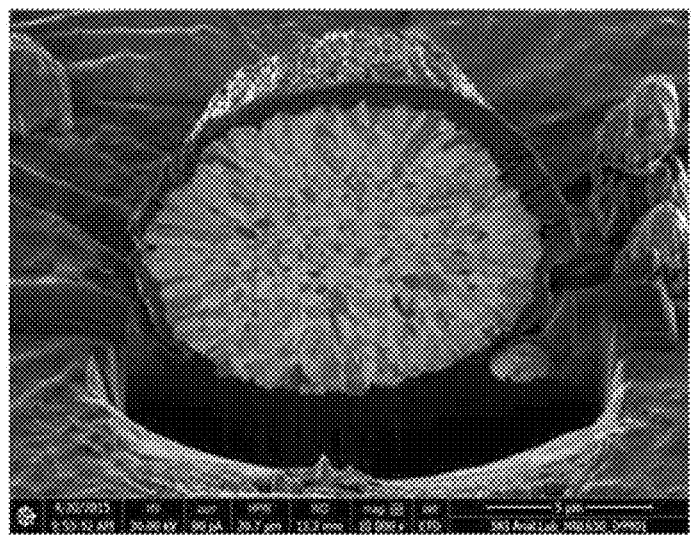
FIG. 2 is a scanning electron microscope (SEM) image showing a cross section of a cathode active material prepared by Examples 1 to 6 of the present disclosure.
Figure 3:
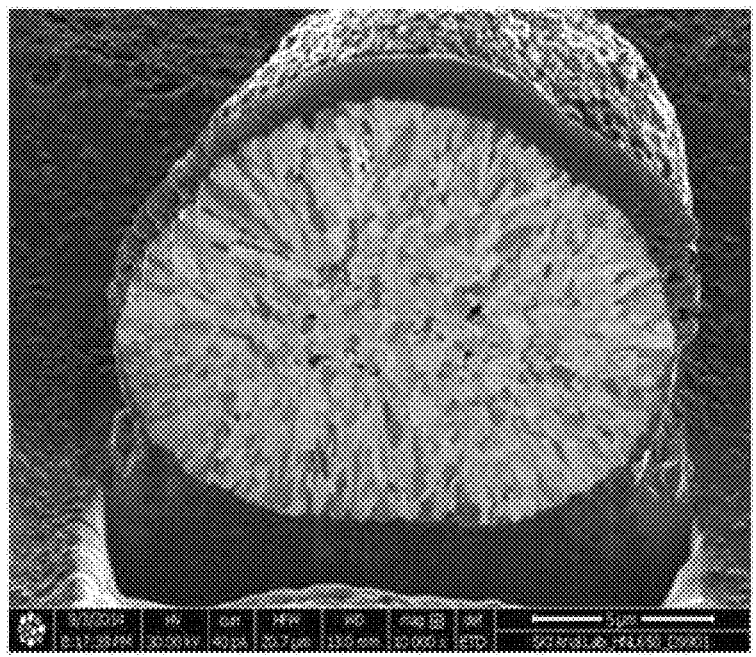
FIG. 3 is a scanning electron microscope (SEM) image showing a cross section of a cathode active material prepared by Examples 7 to 12 of the present disclosure.
Figure 4:
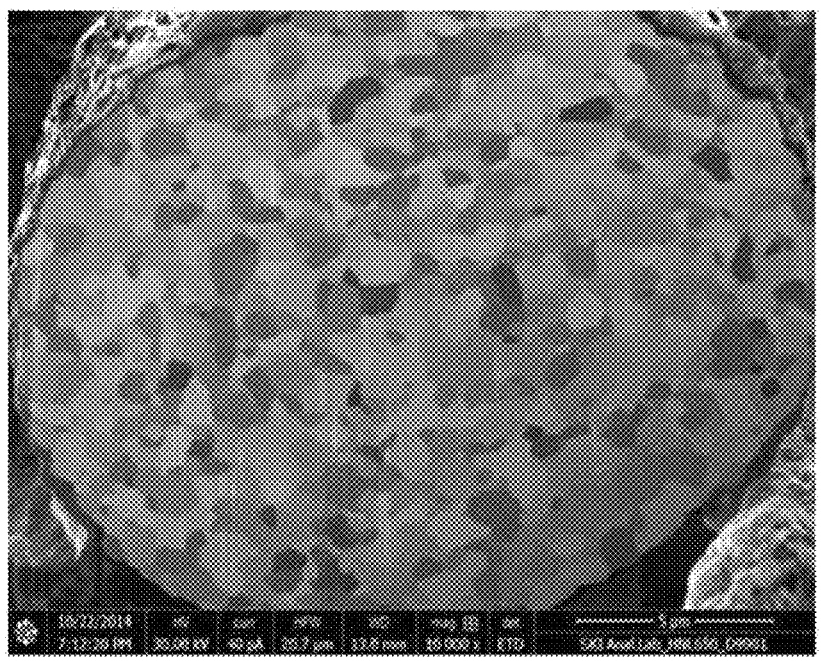
FIG. 4 is a scanning electron microscope (SEM) image showing a cross section of a cathode active material prepared by Comparative Examples 1 to 6 of the present disclosure.

A structure of the cathode active material prepared through the present disclosure will be described in more detail with reference to FIG. 1 showing a cross section of the cathode active material. The cathode active material according to the present disclosure may be divided into from the central part 1 to the surface part 13 on the basis of the cross section. It is noted that numbers shown in FIG. 1 are arbitrarily described to divide the central part and the surface part, and the present disclosure is not limited thereto. In addition, the central part or the surface part is not limited to only a region of the single number. For example, the central part may occupy 1 to 5 regions in FIG. 1, and the surface part may have the other regions. This also applies to a case where the central part is divided into a first central part and a second central part.

Hereinafter, the cathode active material according to the present disclosure is described in more detail through a preparation method.

The preparation method of the cathode active material according to the present disclosure specifically includes a) forming a central part by simultaneously mixing a lithium source material, one or more transition metal source materials, a chelating agent, and a basic aqueous solution, followed by firing; b) preparing a compound for forming a surface part by simultaneously mixing the lithium source material, one or more of the transition metal source materials, the chelating agent, and the basic aqueous solution, followed by firing, and grinding into a nano-size; c) forming the surface part on a surface of the central part by mixing the central part obtained in step a) and the compound for forming a surface part obtained in step b); and d) forming a structure in which a section having a different transition metal concentration exists between the central part and the surface part by heat treating the compound obtained in step c).

Further, in the present disclosure, when the structure of the cathode active material includes the first central part, the second central part, and the surface part, the preparation method of the cathode active material may include a) forming a first central part by simultaneously mixing a lithium source material, one or more transition metal source materials, a chelating agent, and a basic aqueous solution, followed by firing; b) preparing a compound for forming a second central part by simultaneously mixing the lithium source material, one or more of the transition metal source materials, the chelating agent, and the basic aqueous solution, followed by firing, and grinding into a nano-size; c) preparing a compound for forming a surface part by simultaneously mixing the lithium source material, one or more of the transition metal source materials, the chelating agent, and the basic aqueous solution, followed by firing, and grinding into a nano-size; d) forming the second central part on a surface of the first central part by mixing the first central part obtained in step a) and the compound for forming a second central part obtained in step b); e) forming the surface part on a surface of the second central part by mixing the compound obtained in step d) and the compound for forming a surface part obtained in step c); and f) forming a structure in which a section having a different transition metal concentration exists among the first central part, the second central part, and the surface part by heat treating the compound obtained in step e).

When the cathode active material according to the present disclosure has the structure of the central part and the surface part, firstly, in step a), the central part may be formed by simultaneously mixing the lithium source material, one or more of the transition metal source materials, the chelating agent, and the basic aqueous solution, followed by firing.

The lithium source material in the present disclosure is not limited in view of a kind as long as it is a material generally used in preparation of the cathode active material, etc., in the art, and for example, the lithium source material is not particularly limited as long as it is a lithium salt such as lithium carbonate, lithium nitrate, etc.

In the present disclosure, the transition metal source material may include a metal salt of at least one element selected from the group consisting of nickel (Ni), cobalt (Co), manganese (Mn), iron (Fe), sodium (Na), calcium (Ca), titanium (Ti), vanadium (V), chromium (Cr), copper (Cu), zinc (Zn), germanium (Ge), strontium (Sr), silver (Ag), barium (Ba), zirconium (Zr), niobium (Nb), molybdenum (Mo), aluminum (Al), gallium (Ga), boron (B), and a combination thereof. In addition, the metal salt may be a sulfate, a nitrate, an acetate, a halide, a hydroxide, etc., and is not particularly limited as long as it is capable of being dissolved in a solvent.

More specifically, as the transition metal source material in the present disclosure, M1 may be a nickel (Ni) salt, M2 may be a cobalt (Co) salt, and M3 may be a manganese (Mn) salt in Chemical Formulas 1 to 5. In addition, the transition metal source material may be mixed by controlling molar ratio so as to have high capacity characteristic. The molar ratio may be easily controlled according to metal composition of the central part to be obtained, and the molar ratio of the transition metal may be, for example, X1+Y1+Z1=1 in Chemical Formula 1.

The chelating agent used in the present disclosure may be an aqueous ammonia solution, an aqueous ammonium sulfate solution, or a mixture thereof, and the molar ratio between the chelating agent and the transition metal source material may be 0.1 to 0.5:1, but the present disclosure is not limited thereto.

Examples of the basic aqueous solution used in the present disclosure may include sodium hydroxide, potassium hydroxide, etc., but the basic aqueous solution is not limited thereto, and may be any material regardless of the type as long as it is a basic material that is generally usable in preparation of the active material. In addition, the basic aqueous solution may have a concentration of 1 to 5 M, but the present disclosure is not limited thereto.

In the present disclosure, a co-precipitation method may be applied in step a). More specifically, one or more transition metal salts are dissolved in a solvent such as distilled water, etc., and then, a chelating agent and a basic aqueous solution are continuously introduced into a reactor, respectively, to generate precipitation. Here, an average residence time of a transition metal salt solution in the reactor may be controlled to 2 to 12 hours, pH may be controlled to 10 to 12.5, preferably 10.5 to 11.5, and a temperature of the reactor may be controlled to 50 to 100° C. Further, a reaction time in the reactor may be controlled to 5 to 40 hours, preferably 10 to 30 hours. However, these conditions may be freely changed depending on a composition of the source materials, a composition ratio thereof, etc., and the present disclosure is limited thereto.

A precipitate prepared through the reactor may be collected in a slurry form, and then, this slurry solution may be filtered, washed and dried to obtain a metal composite oxide. The metal composite oxide may be mixed with a lithium source material at a predetermined ratio, followed by heat firing at 900 to 1,000° C. under air flow, thereby forming the central part. A ratio of the lithium source material and the metal composite oxide is not limited, but is preferably a weight ratio of 1:1.

Next, in step b), the compound for forming a surface part may be prepared by simultaneously mixing the lithium source material, one or more of the transition metal source materials, the chelating agent, and the basic aqueous solution, followed by firing, and grinding into a nano-size.

The transition metal source material formed on the surface part in the present disclosure may be the same as or different from the transition metal source material used in the formation of the central part. More specifically, similar to the formation of the central part, as the transition metal source material of the surface part, M1 may be a nickel (Ni) salt, M2 may be a cobalt (Co) salt, and M3 may be a manganese (Mn) salt. Further, the transition metal source material may be mixed by controlling molar ratio so as to have high capacity characteristic. The molar ratio may be easily controlled according to metal composition of the central part to be obtained, and the molar ratio of the transition metal may be, for example, X1+Y1+Z1=1 in Chemical Formula 1.

The kind and amount of the chelating agent and the basic aqueous solution used for preparing the compound for forming a surface part in the present disclosure may be the same as or different from those of the central part, and the present disclosure is not limited thereto.

In the present disclosure, step b) may be performed by the co-precipitation method which is the same as step a). Here, an average residence time, pH, and a reaction time, etc., of the transition metal salt solution in step b) may be the same as or different from step a), but the present disclosure is not limited thereto. In addition, drying of the precipitate obtained through the reactor and the mixing of the lithium source material may also be performed under the same conditions as step a). The ratio of the lithium source material and the metal composite oxide (precipitate) is not limited, but is preferably 1:1.

The compound for forming the surface part obtained in step b) may be ground into several nanometers using an air jet mill. Accordingly, it is possible to improve electrical conductivity of the cathode active material to be prepared.

Next, in step c), the surface part may be formed on the surface of the central part by mixing the central part obtained in step a) and the compound for forming a surface part obtained in step b). In this step, a method of forming the surface part is not limited. For example, the compound for forming a central part and a surface part may be put into a high-speed dry coater and mixed at a speed of 1,000 to 50,000 rpm. Accordingly, the compound for forming a surface part may be coated on the surface of the central part while being surrounded with a predetermined thickness. Further, in step c), a thickness of the surface part coating the central part may be controlled by adjusting a retention time, a temperature and a rotation speed in the coater.

The obtained compound may be subjected to a heat treatment as step d) to form a structure in which the transition metal has a different concentration between the central part and the surface part. Here, a temperature for heat treatment is not limited in the present disclosure, but may be 300 to 1,000° C., and an atmosphere may also be an oxidizing atmosphere such as air, oxygen, or the like. Further, time for heat treatment may be 10 to 30 hours, and a pre-firing process may be performed by maintaining the temperature at 150 to 800° C. for 5 to 20 hours before the heat treatment, or an annealing process may be performed at 600 to 800° C. for 10 to 20 hours after the heat treatment.

In the present disclosure, when the structure of the cathode active material includes the first central part, the second central part, and the surface part, the cathode active material may be prepared in the same manner as the cathode active material having a two-layer structure of the central part and the surface part. Specifically, when the second central part is coated on the first central part, a composition for forming a second central part may be firstly ground, and put into a reactor, stirred and coated, and then, the surface part may be formed on the surface of the second central part in the same manner as above.

The prepared cathode active material may include a conductive source material, followed by milling, thereby preparing a slurry for preparing a cathode including the conductive material and the cathode active material.

The conductive source material usable in the present disclosure may be divided into a carbon large surface area structure and a carbon small surface area structure on the basis of a shape.

The term "carbon large surface area structure" used herein means a material in which one particle consisting of carbon atoms arranged in a hexagonal shape has a surface area of 5,000 $nm^2$ or more, and may include all carbon structures that mainly do not have a point shape such as a two-dimensional surface or a three-dimensional cylinder.

Further, the term "carbon small surface area structure" used herein means a material in which one particle consisting of carbon atoms arranged in a hexagonal shape has a surface area of less than 5,000 $nm^2$, and may include all carbon structures having a point shape rather than the carbon large surface area structure.

An example of the carbon large surface area structure in the present disclosure may be any one or more selected from graphene, single-walled carbon nanotube, and multi-walled carbon nanotube.

An example of the carbon small surface area structure in the present disclosure may be any one or more selected from fullerene; black lead such as graphite, natural black lead, artificial black lead, etc.; carbon black, acetylene black, KETJENBLACK™, DENKA BLACK™, thermal black, channel black, furnace black, lamp black, thermal black, and SUPER P™.

As the conductive source material in the present disclosure, conductive fibers such as carbon fiber, metal fiber, etc.; fluorinated carbon; metal powders such as aluminum powder, nickel powder, etc., conductive whiskers such as zinc oxide and potassium titanate, etc.; conductive oxides such as titanium oxide, etc.; and conductive polymers such as polyphenylene derivative, etc., may be used alone or two or more thereof may be mixed in addition to the carbon large surface area structure and the carbon small surface area structure, but the present disclosure is not necessarily limited thereto.

The conductive source material used in the present disclosure may be more specifically a mixture of carbon nanotube and carbon black. It is intended to induce formation of a three-dimensional network structure by mixing conductive materials having different structural characteristics so that point, line and surface contact are formed together between the conductive materials. Specifically, the carbon nanotube has a cylindrical shape and has a large specific surface area. Meanwhile, the carbon black has a nano-sized spherical shape, and thus, the carbon black may be easily adsorbed on the surface of the carbon nanotube to form the three-dimensional network structure. When the three-dimensional network structure is formed, π-π interaction between the conductive source materials may be reduced, and as a result, it is possible to rather suppress reduction in the electrical characteristics caused by re-aggregation of the respective conductive source materials.

In the present disclosure, with regard to a mixing ratio of the conductive source material, the carbon large surface area structure and the carbon small surface area structure may be mixed at a weight ratio of 10:90 to 70:30, and more specifically, a weight ratio of 20:80 to 40:60. When the carbon large surface area structure is added at a weight ratio of less than 10 or the carbon small surface area structure is added at a weight ratio of more than 90, contactability between the conductive material and the cathode active material is reduced, which causes a decrease in the discharge output and the low-temperature characteristic. When the carbon large surface area structure is added at a weight ratio of more than 70 or the carbon small surface area structure is added at a weight ratio of less than 30, it is not preferable since the contactability between the conductive material and the cathode active material is reduced.

The cathode active material according to the present disclosure may have a different concentration between the central part and the surface part, and may include the central part represented by Chemical Formula 1 and the surface part represented by Chemical Formula 2 in the order from an inside to an outside:

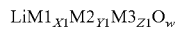    [Chemical Formula 1]

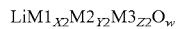    [Chemical Formula 2]

in Chemical Formulas 1 and 2, M1, M2, and M3 are selected from the group consisting of Ni, Co, Mn, Fe, Na, Ca, Ti, V, Cr, Cu, Zn, Ge, Sr, Ag, Ba, Zr, Nb, Mo, Al, Ga, B, and a combination thereof, $0.75 \leq X1 \leq 0.9$, $0.75 \leq X2 \leq 0.9$, $0 \leq Y1 \leq 0.2$, $0 \leq Y2 \leq 0.2$, $0.01\ Z1 \leq 0.2$, $0.01 \leq Z2 \leq 0.2$, $0 \leq W \leq 3$, $0 < X1+Y1+Z1 \leq 1$, $0 < X2+Y2+Z2 \leq 1$, $X2 \leq X1$, $Y1 \leq Y2$, and $Z1 \leq Z2$, except that the Chemical Formula 1 and the Chemical Formula 2 are the same.

In addition, in another embodiment of the cathode active material for a lithium secondary battery according to the present disclosure, the concentration of the metal may be different from the central part to the surface part, and the cathode active material may include a first central part represented by Chemical Formula 3 below, a second central part represented by Chemical Formula 4 below, and the surface part represented by Chemical Formula 5 below in the order from the inside to the outside:

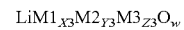    [Chemical Formula 3]

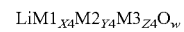    [Chemical Formula 4]

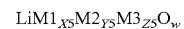    [Chemical Formula 5]

in Chemical Formulas 3 to 5, M1, M2, and M3 are selected from the group consisting of Ni, Co, Mn, Fe, Na, Ca, Ti, V, Cr, Cu, Zn, Ge, Sr, Ag, Ba, Zr, Nb, Mo, Al, Ga, B, and a combination thereof, $0.75 \leq X3 \leq 0.9$, $0.75 \leq X4 \leq 0.9$, $0.75 \leq X5 \leq 0.9$, $0 \leq Y3 \leq 0.2$, $0 \leq Y4 \leq 0.2$, $0 \leq Y5 \leq 0.2$, $0.01 \leq Z3 \leq 0.2$, $0.01 \leq Z4 \leq 0.2$, $0.01 \leq Z5 \leq 0.2$, $0 \leq W \leq 3$, $0 < X3+Y3+Z3 \leq 1$, $0 < X4+Y4+Z4 \leq 1$, $0 < X5+Y5+Z5 \leq 1$, $X5 \leq X4 \leq X3$, $Y3 \leq Y4 \leq Y5$, $Z3 \leq Z4 \leq Z5$, except that the Chemical Formulas 3 to 5 are the same, respectively, or all of the Chemical Formulas 3 to 5 are the same.

More specifically, in Chemical Formulas 1 to 5 of the present disclosure, M1 may be Ni, M2 may be Co, and M3 may be Mn. By using nickel, cobalt, and manganese as the transition metals for the cathode active material, and simultaneously, by controlling the composition ratio as shown in Chemical Formulas 1 to 5, it is possible to suppress over-discharge of a lithium secondary battery to be produced, and simultaneously, to suppress occurrence of impurities such as lithium hydroxide (LiOH), lithium carbonate ($Li_2CO_3$), etc., and as a result, the capacity of the battery may be increased.

In the present disclosure, it is possible to have a continuous gradient of the concentration of the transition metal included in the cathode active material from the central part to the surface part by controlling the molar ratio of M1 to M3 in Chemical Formulas 1 to 5.

In particular, in Chemical Formulas 1 to 5 of the present disclosure, when M1 is Ni, M2 is Co, and M3 is Mn, the molar ratio of M1 may be decreased from the central part to the surface part, and the molar ratio of M3 may be increased from the central part to the surface part. Specifically, the molar ratio of M2, cobalt, may be fixed, and the content of nickel may be gradually reduced from the central part, and simultaneously, the content of manganese may be gradually increased from the central part, and a molar ratio of the entire transition metal may be fixed to a predetermined range.

More specifically, the cathode active materials represented by Chemical Formulas 1 and 2 may satisfy Equations 1 and 2:

$$0.01 \leq |X1 - X2| \leq 0.05 \quad \text{[Equation 1]}$$

$$0.01 \leq |Z1 - Z2| \leq 0.05. \quad \text{[Equation 2]}$$

Further, the cathode active materials represented by Chemical Formulas 3 to 5 may satisfy Equations 3 to 8:

$$0.01 \leq |X3 - X4| \leq 0.05 \qquad \text{[Equation 3]}$$

$$0.01 \leq |X4 - X5| \leq 0.05 \qquad \text{[Equation 4]}$$

$$0.01 \leq |X3 - X5| \leq 0.1 \qquad \text{[Equation 5]}$$

$$0.01 \leq |Z3 - Z4| \leq 0.05 \qquad \text{[Equation 6]}$$

$$0.01 \leq |Z4 - Z5| \leq 0.05 \qquad \text{[Equation 7]}$$

$$0.01 \leq |Z3 - Z5| \leq 0.1. \qquad \text{[Equation 8]}$$

Equations 1 to 8 show the difference in molar ratio of the transition metal between the central part and the surface part. When the cathode active material satisfies Equations 1 to 8, it is possible to suppress the occurrence of impurities that may be caused due to a rapid difference in composition of the transition metal, and to improve a discharge capacity and low-temperature characteristic of the lithium secondary battery to be produced.

More specifically, Equations 1 to 8 show the difference in molar ratio of the transition metal between the central part and the surface part, and particularly, when M1 is lithium, Equations 1 to 8 show a change in molar ratio of lithium between the surface part and the central part, and a change in molar ratio of other transition metals according to the change in molar ratio of lithium.

In general, since a concentration of lithium with regard to a concentration of other transition metals is increased from the surface part to the central part, the change in concentration from the surface part to the central part needs to be clearly reflected, and simultaneously, a rapid change in concentration needs to be prevented.

Equations 1 to 8 show the difference in molar ratio of the transition metal. When the difference in molar ratio of the transition metal between the central part and the surface part is less than the range of Equations 1, 3 to 5, or more than the range of Equations 2, 6 to 8, the difference in transition metal concentration between the central part and the surface part or between the first central part and the second central part may not occur, and thus, excess transition metal carbonate or hydroxide remains on the surface, and a large amount of gas is generated at a high temperature at the time of cell assembly, such that a battery case is easy to be swollen, and at the time of mixing an electrode for the cell assembly, gelation may easily occur, and when the electrodes are coated, agglomeration may occur easily, which may cause surface defects.

On the contrary, when the difference in molar ratio of the transition metal between the central part and the surface part is more than the range of Equations 1, 3 to 5 or less than the range of Equations 2, 6 to 8, a lithium concentration in the central part and the surface part may be rapidly changed, and thus, the cathode active material may be structurally unstable, which may cause defects of the secondary battery.

Further, in the cathode active material according to the present disclosure, thicknesses of the second central part and the surface part may be controlled by controlling the residence time, the temperature, and the rotation speed in the coater at the time of forming the surface part or the second central part and the surface part. More specifically, the cathode active material represented by Chemical Formulas 1 and 2 may satisfy Equation 9 below, and the cathode active material represented by Chemical Formulas 3 to 5 may satisfy Equations 10 and 11 below:

$$0.5 \leq L_1/L \leq 0.99 \qquad \text{[Equation 9]}$$

in Equation 9, $L_1$ is a distance from the center of the cathode active material to a boundary between the surface part and the central part, and L is a radius of an entire cathode active material.

$$0.05 \leq L_2/L \leq 0.5 \qquad \text{[Equation 10]}$$

$$0.01 \leq L_3/L \leq 0.2 \qquad \text{[Equation 11]}$$

in Equation 10, $L_2$ is a distance from the center of the cathode active material to a boundary between the first central part and the second central part, $L_3$ is a distance from the boundary between the first central part and the second central part to a boundary between the second central part and the surface part, and L is a radius of an entire cathode active material.

In the present disclosure, Equations 9 to 11 indicate a difference in concentration of the transition metal of the cathode active material, which show a thickness of the central part in the entire cathode active material as a ratio. Specifically, the concentration gradient of the transition metal from the central part to the surface part may be controlled though the thicknesses of the central part and the surface part. When the concentration of the transition metal is excessively high on the surface part, the occurrence of impurities that may be caused may be suppressed, and a rapid change in concentration of the central part and the surface part may be suppressed to increase structural stability of the cathode active material.

When the cathode active material has the range more than or less than that of Equations 9 to 11 in the present disclosure, the concentration of a specific transition metal, particularly, lithium, may be increased on the surface part, which may cause impurities such as carbonates, hydroxides, etc., of the transition metal, such that defects of the secondary battery may occur.

The cathode active material according to the present disclosure has a section where the transition metal has a difference in concentration from the central part to the surface part, thereby maintaining high capacity, high energy density, and heat stability and simultaneously improving a discharge capacity at a low temperature, such that the cathode active material may have excellent characteristics.

The cathode according to the present disclosure may be produced by preparing a cathode active material composition including the cathode active material, the conductive material, a binder and a solvent, and then, directly coating and drying the composition on a current collector. Otherwise, the cathode may be produced by casting the cathode active material composition on a separate support, and laminating a film obtained by peeling from the support on an aluminum current collector.

A lithium secondary battery according to the present disclosure may have a structure in which an electrode laminate is impregnated with an electrolyte, the electrode laminate including a plurality of stacked cathodes and anodes facing each other with separators interposed therebetween.

Specifically, the lithium secondary battery according to an exemplary embodiment of the present disclosure may include an electrode assembly in which cathodes and anodes facing each other are alternately stacked with separators interposed therebetween, an electrolyte impregnated in the electrode assembly, and a battery case sealing the electrode assembly and the electrolyte.

The respective cathodes of the electrode assembly may be connected in series or in parallel or in serial-parallel, and the respective anodes may also be connected in series or in parallel or in serial-parallel. Here, the cathode may include a current collector and a cathode active material layer containing a cathode active material on the current collector, and the cathode may include a non-coated part in which the cathode active material layer is not formed on the current collector. The anode may also include a current collector and an anode active material layer containing an anode active material on the current collector, and the anode may include a non-coated part in which the anode active material layer is not formed on the current collector. Electrical connection between the respective cathodes or between the respective anodes of the electrode assembly may be achieved through the non-coated parts.

The current collectors of each cathode and/or each anode in the electrode assembly may be porous conductors, and more specifically, the current collector may be a foam, a film, a mesh, a felt, or a perforated film made of conductive materials. More specifically, the current collector may be a conductive material having excellent conductivity and including graphite, graphene, titanium, copper, platinum, aluminum, nickel, silver, gold, or carbon nanotube that are chemically stable at the time of charging and discharging the battery, and may have a shape of a foam, a film, a mesh, a felt, or a perforated film made of conductive materials, and may be a complex coated or stacked with different conductive materials.

The anode active material of each anode in the electrode assembly is usable as long as it is an active material generally used in the anode of the secondary battery. As one example of the lithium secondary battery, the anode active material is used as long as it is capable of performing lithium intercalation. As one of the non-limiting examples, the anode active material may be one or more selected from anode active material groups of lithium (metal lithium), graphitizable carbon, non-graphitizable carbon, graphite, silicon, Sn alloy, Si alloy, Sn oxide, Si oxide, Ti oxide, Ni oxide, Fe oxide (FeO), and lithium-titanium oxide ($LiTiO_2$, $Li_4Ti_5O_{12}$), and may be a composite of at least two or more (a first anode active material and a second anode active material) selected from the anode active material groups. The composite may have a structure in which the first anode active material and the second anode active material are simply mixed, a core shell structure including a core of the first anode active material and a shell of the second anode active material, a structure in which the second anode active material is supported on a matrix of the first anode active material, a structure in which the second anode active material is coated or supported on the first anode active material having a zero-dimensional nanostructure or one-dimensional nanostructure or two-dimensional nanostructure, or a structure in which the first anode active material and the second anode active material are stacked.

In the electrode assembly, the separators positioned between the cathodes and the anodes adjacent to each other may be different from each other or may be the same as each other per position according to a stacked direction of the cathodes and the anodes, and are usable as long as they are separators generally used to prevent short-circuit of the anodes and the cathodes in general secondary batteries. As a non-limiting example based on the lithium secondary battery, the separator may be one or more selected from polyethylene-based materials, polypropylene-based materials, polyolefin-based materials, and polyester-based materials, and may have a microporous film structure. Here, the microporous film may be coated with an inorganic material. In addition, the separator may have a stacked structure in which a plurality of organic films such as polyethylene films, polypropylene films, and nonwoven fabric, and the like, are stacked to prevent over-current, maintain the electrolyte, and improve physical strength.

The above-described electrode assembly may be produced by a production method of a general jelly-roll type electrode assembly, and as one example, the electrode assembly may be formed by rolling a plurality of cathodes and anodes that are spaced apart from each other while being disposed alternately to each other, on one surface of the separator. However, the present disclosure is not limited to the above-described production method of the electrode assembly.

The electrolyte impregnated in the electrode assembly may be a general aqueous or non-aqueous electrolyte capable of smoothly conducting lithium ions involved in charging and discharging of the battery and stably maintaining battery characteristics for a long period of time in conventional lithium secondary batteries.

An example of the electrolyte in the present disclosure may be a non-aqueous electrolyte, and the non-aqueous electrolyte may include a non-aqueous solvent and a lithium salt. One of the non-limiting examples of the lithium salt contained in the electrolyte may be a salt providing a lithium cation and one or more anions selected from the group consisting of $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$.

The solvent of the electrolyte may be one or more solvents selected from the group consisting of ethylene carbonate, propylene carbonate, 1,2-butylene carbonate, 2,3-butylene carbonate, 1,2-pentylene carbonate, 2,3-pentylene carbonate, vinylene carbonate, dimethyl carbonate, diethyl carbonate, di(2,2,2-trifluoroethyl) carbonate, dipropyl carbonate, dibutyl carbonate, ethylmethyl carbonate, 2,2,2-trifluoroethyl methylcarbonate, methylpropyl carbonate, ethylpropyl carbonate, 2,2,2-trifluoroethyl propyl carbonate, methyl formate, ethyl formate, propyl formate, butyl formate, dimethyl ether, diethyl ether, dipropyl ether, methylethyl ether, methylpropyl ether, ethylpropyl ether, methyl acetate, ethyl acetate, propyl acetate, butyl acetate, methyl propionate, ethyl propionate, propyl propionate, butyl propionate, methyl butyrate, ethyl butyrate, propyl butyrate, butyl butyrate, γ-butyrolactone, 2-methyl-γ-butyrolactone, 3-methyl-γ-butyrolactone, 4-methyl-γ-butyrolactone, γ-thiobutyrolactone, γ-ethyl-γ-butyrolactone, β-methyl-γ-butyrolactone, γ-valerolactone, σ-valerolactone, γ-caprolactone, s-caprolactone, β-propiolactone, tetrahydrofuran, 2-methyl tetrahydrofuran, 3-methyltetrahydrofuran, trimethyl phosphate, triethyl phosphate, tris(2-chloroethyl) phosphate, tris (2,2,2-trifluoroethyl) phosphate, tripropyl phosphate, triisopropryl phosphate, tributyl phosphate, trihexyl phosphate, triphenyl phosphate, tritolyl phosphate, methyl ethylene phosphate, ethyl ethylene phosphate, dimethyl sulfone, ethyl methyl sulfone, methyl trifluoromethyl sulfone, ethyl trifluoromethyl sulfone, methyl pentafluoroethyl sulfone, ethyl pentafluoroethyl sulfone, di(trifluoromethyl)sulfone, di(pentafluoroethyl) sulfone, trifluoromethyl pentafluoroethyl sulfone, trifluoromethyl nonafluorobutyl sulfone, pentafluoroethyl nonafluorobutyl sulfone, sulfolane, 3-methylsulfolane, 2-methylsulfolane, 3-ethylsulfolane, and 2-ethylsulfolane.

Hereinafter, the present disclosure is described in more detail on the basis of Examples and Comparative Examples. However, Examples below are intended to illustrate the most preferred examples of the present disclosure, and the present disclosure is not limited to the following Examples and Comparative Examples below.

Physical properties of samples manufactured in Examples and Comparative Examples were measured as below, and respective batteries were manufactured as follows.

(Discharge Output)

Output characteristics of the batteries manufactured in Examples and Comparative Examples were measured in the manner of HPPC (hybrid pulse power characterization by freedom car battery test manual.

(Low-Temperature Characteristic)

Low-temperature characteristics of the batteries manufactured in the Examples and Comparative Examples were measured through comparison in capacity with charging at 0.5C and discharging at 0.5C at room temperature (25° C.) and at −20° C. relative to room temperature.

(Anode)

As an anode, an active material of the carbon small surface area structure coated on a copper substrate was used.

(Electrolyte)

1M $LiPF_6$ solution was prepared by using a solvent containing ethylene carbonate (EC)/ethylmethyl carbonate (EMC)/diethylcarbonate (DEC) mixed at a volume ratio of 25/45/30, and 1 wt % of vinylene carbonate (VC), 0.5 wt % of 1,3-propenesultone (PRS), and 0.5 wt % of bis(oxalato) borate (LiBOB) were added thereto.

(Battery)

A cell was configured by notching a cathode plate and an anode plate, respectively, stacking the plates, and interposing a separator (polyethylene, thickness of 25 μm) between the cathode plate and the anode plate. Then, welding was performed on each tab part of the cathode and the anode.

Next, the welded assembly of cathode/separator/anode was put into a pouch, and three sides except for a liquid injection side of the electrolyte were sealed. Here, the parts with the tab were included in the sealing part, and the electrolyte was injected into the other part, and the liquid injection side was sealed and impregnated for 12 hours.

Then, pre-charging was performed with a current of 0.25C (2.5A) for 36 minutes. After the pre-charging was completed, gas was removed and aging was performed for 24 hours. Then, formation charge-discharge was performed under the charging condition with CC-CV 0.2C 4.2V 0.05C Cut-off and discharging condition with CC 0.5C 2.5V Cut-off, followed by standard charge-discharge (charging condition with CC-CV 0.5C 4.2V Cut-off and discharging condition with CC 0.5C 2.5V Cut-off).

Examples 1 to 4

As the cathode active material, a lithium-transition metal oxide (CAM 1) having a concentration difference from the central part to the surface part was used, wherein a total composition was $LiNi_{0.8}Co_{0.1}Mn_{0.1}O_2$, the first central part had a composition of $LiNi_{0.83}Co_{0.1}Mn_{0.07}O_2$ (in Table 1, positions: 1 to 4, an error range of a molar ratio: ±0.01 molar ratio), the second central part had a composition of $LiNi_{0.8}Co_{0.1}Mn_{0.1}O_2$ (in Table 1, positions: 1 to 5, an error range of a molar ratio: ±0.01 molar ratio), the surface part had a composition of $LiNi_{0.78}Co_{0.1}Mn_{0.12}O_2$ (in Table 1, positions: 6 to 13, an error range of a molar ratio: ±0.01 molar ratio). Here, the cathode active material had composition of $|X3-X4|=|Z3-Z4|=0.03$, $|X4-X5|=Z4-Z5|=0.02$, $|X3-X5|=|Z3-Z5|=0.05$, $L_2/L=0.31$, and $L_3/L=0.08$.

Next, as the conductive material, a mixture obtained by mixing the carbon small surface area structure, i.e., DENKA BLACK™ (conductive material 1, manufacturer: Denka, Japan, product name: DENKA BLACK™) and the carbon large surface area structure, i.e., carbon nanotube (conductive material 2) according to the composition of Table 3 below was used. As the binder, polyvinylidene fluoride (PVDF) having a weight average molecular weight of 750,000 was used.

The cathode was manufactured by using the cathode active material, the conductive material, and the binder at a weight ratio of 92:5:3, followed by coating, drying, and pressing on an aluminum substrate. Here, concentration gradients of the transition metals used in the cathode active material were shown in Table 1 below, and positions at which the concentrations were measured were the same as shown in FIG. 1. The concentrations were measured at an interval of 0.4 μm from the center of the cathode active material with regard to a lithium-transition metal oxide particle having a radius of 4.8 μm.

TABLE 1

| Position | Ni (wt %) | Co (wt %) | Mn (wt %) |
|---|---|---|---|
| 1 | 0.830 | 0.100 | 0.070 |
| 2 | 0.831 | 0.101 | 0.068 |
| 3 | 0.829 | 0.100 | 0.071 |
| 4 | 0.830 | 0.100 | 0.070 |
| 5 | 0.800 | 0.099 | 0.101 |
| 6 | 0.780 | 0.100 | 0.120 |
| 7 | 0.780 | 0.100 | 0.120 |
| 8 | 0.780 | 0.101 | 0.119 |
| 9 | 0.781 | 0.100 | 0.119 |
| 10 | 0.779 | 0.101 | 0.120 |
| 11 | 0.780 | 0.100 | 0.120 |
| 12 | 0.781 | 0.099 | 0.120 |
| 13 | 0.780 | 0.100 | 0.120 |

Examples 5 to 8

As the cathode active material, a lithium-transition metal oxide (CAM 2) having a concentration difference from the central part to the surface part was used, wherein a total composition was $LiNi_{0.78}Co_{0.11}Mn_{0.09}O_2$, the central part had a composition of $LiNi_{0.802}Co_{0.11}Mn_{0.888}O_2$ (in Table 1, positions: 1 to 12, an error range of a molar ratio: ±0.02 molar ratio), and the surface part had a composition of $LiNi_{0.77}Co_{0.11}Mn_{0.12}O_2$ (in Table 1, position: 13, an error range of a molar ratio: ±0.01 molar ratio). Here, the cathode active material had composition of $|X1-X2|=|Z1-Z2|=0.032$, and $L_1/L=0.92$.

Next, as the conductive material, a mixture obtained by mixing the carbon small surface area structure, i.e., DENKA BLACK™ (conductive material 1, manufacturer: Denka, Japan, product name: DENKA BLACK™) and the carbon large surface area structure, i.e., carbon nanotube (conductive material 2) according to the composition of Table 3 below was used. As the binder, polyvinylidene fluoride (PVDF) having a weight average molecular weight of 750,000 was used.

The cathode was manufactured by using the cathode active material, the conductive material, and the binder at a weight ratio of 92:5:3, followed by coating, drying, and pressing on an aluminum substrate. Here, concentration gradients of the transition metals used in the cathode active material were shown in Table 2 below, and positions at which the concentrations were measured were the same as shown in FIG. 1. The concentrations were measured at an interval of 0.4 μm from the center of the cathode active material with regard to a lithium-transition metal oxide particle having a radius of 4.8 μm.

TABLE 2

| Position | Ni (wt %) | Co (wt %) | Mn (wt %) |
|---|---|---|---|
| 1 | 0.802 | 0.110 | 0.088 |
| 2 | 0.801 | 0.111 | 0.088 |
| 3 | 0.802 | 0.110 | 0.088 |
| 4 | 0.802 | 0.110 | 0.088 |
| 5 | 0.803 | 0.111 | 0.086 |
| 6 | 0.802 | 0.110 | 0.088 |
| 7 | 0.802 | 0.110 | 0.088 |
| 8 | 0.802 | 0.109 | 0.089 |
| 9 | 0.801 | 0.110 | 0.089 |
| 10 | 0.802 | 0.110 | 0.088 |
| 11 | 0.802 | 0.108 | 0.090 |
| 12 | 0.800 | 0.110 | 0.090 |
| 13 | 0.770 | 0.110 | 0.120 |

Comparative Examples 1 and 2

The cathode was manufactured in the same manner as Example 1 except that the content of the conductive material was changed as shown in Table 3 below.

Comparative Examples 3 and 4

The cathode was manufactured in the same manner as Example 5 except that the content of the conductive material was changed as shown in Table 3 below.

Comparative Examples 5 to 10

A battery was manufactured in the same manner as Example 1 except that $LiNi_{0.8}Co_{0.1}Mn_{0.1}O_2$ (NCM811) having a uniform composition as an entire particle was used instead of the CAM1 as the cathode active material.

TABLE 3

| | Cathode active material | Conductive material 1 Small surface area structure (wt %) | Conductive material 2 Large surface area structure (wt %) | Discharge output (W/kg) | Low-temperature characteristic (%) |
|---|---|---|---|---|---|
| Example 1 | CAM 1 | 90 | 10 | 3407 | 82 |
| Example 2 | CAM 1 | 80 | 20 | 3605 | 84 |
| Example 3 | CAM 1 | 60 | 40 | 3775 | 90 |
| Example 4 | CAM 1 | 40 | 60 | 3386 | 81 |
| Example 5 | CAM 2 | 90 | 10 | 3264 | 79 |
| Example 6 | CAM 2 | 80 | 20 | 3523 | 81 |
| Example 7 | CAM 2 | 60 | 40 | 3640 | 84 |
| Example 8 | CAM 2 | 40 | 60 | 3213 | 77 |
| Comparative Example 1 | CAM 1 | 95 | 5 | 3050 | 70 |
| Comparative Example 2 | CAM 1 | 20 | 80 | 3100 | 72 |
| Comparative Example 3 | CAM 2 | 95 | 5 | 3030 | 67 |
| Comparative Example 4 | CAM 2 | 20 | 80 | 3080 | 69 |
| Comparative Example 5 | NCM811 | 95 | 5 | 3025 | 63 |
| Comparative Example 6 | NCM811 | 90 | 10 | 3120 | 67 |
| Comparative Example 7 | NCM811 | 80 | 20 | 3150 | 69 |
| Comparative Example 8 | NCM811 | 60 | 40 | 3200 | 69 |
| Comparative Example 9 | NCM811 | 40 | 60 | 3050 | 65 |
| Comparative Example 10 | NCM811 | 20 | 80 | 3000 | 61 |

As shown in Table 3, it could be appreciated that Examples 1 to 8 in which the concentration gradient of the transition metal was controlled had excellent battery output and low-temperature characteristic as compared to those of the Comparative Examples. In particular, it could be appreciated that Examples 1 to 4 in which the structure of the cathode active material had the structure of the first central part, the second central part, and the surface part had higher discharge output and low-temperature characteristic as compared to those of Examples 5 to 8 only having the central part and the surface part.

Further, it could be appreciated that the discharge output and the low-temperature characteristic of the battery were changed depending on the mixing ratio of the DENKA BLACK™ and the carbon nanotube included in the conductive material. More specifically, it could be appreciated that when the content of the DENKA BLACK™ in the mixture of the DENKA BLACK™ and the carbon nanotube was within the predetermined range, the discharge output and the low-temperature characteristic were improved.

On the contrary, it could be appreciated that Comparative Examples 1 to 4 in which the composition ratio of the conductive material was out of the range of Examples had reduced discharge output and low-temperature characteristic, which was because effective contact between the conductive material and the cathode active material was not achieved. In particular, when the tube-shaped carbon nanotube and the spherical nanoparticle, i.e., DENKA BLACK™, were mixed at an appropriate ratio, connection between the cathode active materials was well achieved, such that a conductive path was easily formed. However, when the content of the conductive material was biased to any one side, a large number of pores relatively occurred, resulting in a decrease in conductivity.

Further, it could be appreciated that Comparative Examples 5 to 10 using the cathode active material that did not satisfy Equations 1 to 11 generally had reduced discharge output and low-temperature characteristic as compared to those of the Examples, and it could be confirmed that even Comparative Examples 6 to 8 having the same composition ratio of the conductive material as Examples in which the discharge output and the low-temperature characteristic were the highest had remarkably reduced discharge output (3200 w/kg or less) and low-temperature characteristic (70% or less).

The lithium secondary battery according to the present disclosure may include the cathode containing the cathode active material in which the central part of one or more kinds of metals configuring the cathode active material has a different concentration from the surface part thereof, and simultaneously two or more kinds of conductive materials mixed at a specific range, thereby having excellent stability and high low-temperature characteristic and high output characteristic as compared to a conventional lithium secondary battery.

While exemplary embodiments of the present disclosure have been shown and described above, it will be apparent to those skilled in the art that modifications and variations could be made without departing from the scope of the present disclosure as defined by the appended claims.

What is claimed is:

1. A lithium secondary battery comprising:
   a cathode, an anode, an electrolyte, and a separator,
   wherein the cathode includes a cathode active material comprising a central part represented by Chemical Formula 1 below and a surface part represented by Chemical Formula 2 below in the order from an inside to an outside, and a conductive material comprising a carbon large surface area structure and a carbon small surface area structure,
   wherein the central part has a constant concentration region in which each of M1 concentration and M3 concentration is constant in a direction from the center of the cathode active material to the surface part, and the constant concentration region has a radius of equal to or greater than 0.6 μm from the center of the cathode active material, and
   wherein the cathode active material comprises a concentration gradient region in which M1 concentration continuously decreases and M3 concentration continuously increases in a direction from the end of the constant concentration region to the surface part, the concentration gradient region is positioned between the constant concentration region and the surface part, and the radius of the constant concentration region is greater than a sum of a width of the concentration gradient region and a width of the surface part:

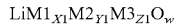      [Chemical Formula 1]

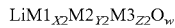      [Chemical Formula 2]

wherein in Chemical Formulas 1 and 2, M1, M2, and M3 are selected from the group consisting of Ni, Co, Mn, Fe, Na, Ca, Ti, V, Cr, Cu, Zn, Ge, Sr, Ag, Ba, Zr, Nb, Mo, Al, Ga, B, and a combination thereof, $0.75 \leq X1 \leq 0.9$, $0.75 \leq X2 \leq 0.9$, $0 \leq Y1 \leq 0.2$, $0 \leq Y2 \leq 0.2$, $0.01 \leq Z1 \leq 0.2$, $0.01 \leq Z2 \leq 0.2$, $0 \leq W \leq 3$, $0 < X1+Y1+Z1 \leq 1$, $0 < X2+Y2+Z2 \leq 1$, $X2 < X1$, $Y1 = Y2$, and $Z1 < Z2$.

2. The lithium secondary battery of claim 1, wherein the carbon large surface area structure and the carbon small surface area structure are mixed at the weight ratio of 10:90 to 70:30 in the conductive material.

3. The lithium secondary battery of claim 1, wherein the carbon large surface area structure and the carbon small surface area structure are mixed at the weight ratio of less than 10: more than 90 in the conductive material.

4. The lithium secondary battery of claim 1, wherein the carbon large surface area structure and the carbon small surface area structure are mixed at the weight ratio of more than 70: less than 30 in the conductive material.

5. The lithium secondary battery of claim 1, wherein the conductive material further comprises any one or two or more selected from a conductive fiber, a fluorinated carbon, a metal powder, a conductive whisker, a conductive oxide and a conductive polymer.

6. The lithium secondary battery of claim 1, wherein the carbon large surface area structure comprises any one or two or more selected from graphene, single-walled carbon nanotube and multi-walled carbon nanotube, and the carbon small surface area structure comprises any one or two or more selected from fullerene, graphite, black lead, carbon black, acetylene black, thermal black, channel black, furnace black, lamp black and thermal black.

7. The lithium secondary battery of claim 1, wherein the cathode active material satisfies Equations 1 and 2 below:

$$0.01 \leq |X1 - X2| \leq 0.05 \quad \text{[Equation 1]}$$

$$0.01 \leq |Z1 - Z2| \leq 0.05. \quad \text{[Equation 2]}$$

8. The lithium secondary battery of claim 1, wherein the surface part has a width of equal to or greater than 0.4 μm from the outermost surface of the cathode active material.

* * * * *